J. LYTLE, Jr.
TRELLIS.
APPLICATION FILED JULY 9, 1912.
1,083,450.
Patented Jan. 6, 1914.
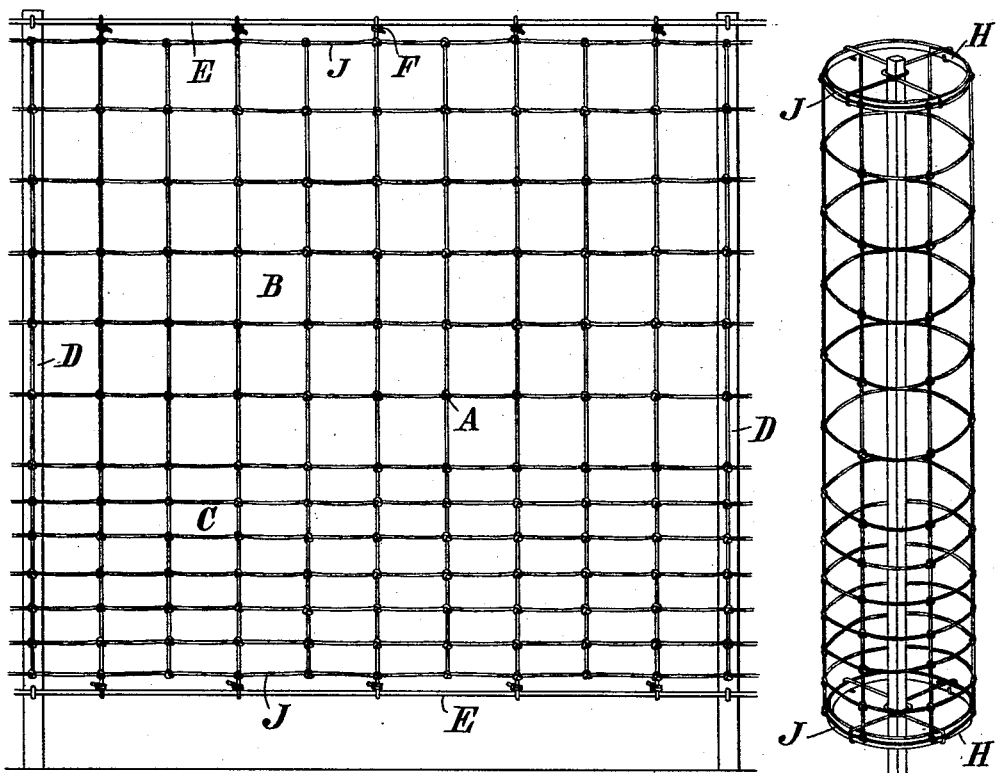
Fig. 1.
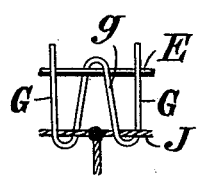
Fig. 2.
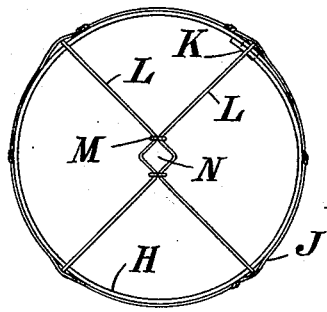
Fig. 3.
Fig. 4.
Witnesses
Chas Leslie
John S. Atkinson
Inventor
J. Lytle. Jnr.
By his attorney
Wm P Thompson

UNITED STATES PATENT OFFICE.

JOSEPH LYTLE, JR., OF LIVERPOOL, ENGLAND.

TRELLIS.

1,083,450.  Specification of Letters Patent.  Patented Jan. 6, 1914.

Application filed July 9, 1912. Serial No. 708,505.

*To all whom it may concern:*

Be it known that I, JOSEPH LYTLE, Jr., a subject of the King of Great Britain, residing at Formby, Liverpool, in the county of Lancaster, in the Kingdom of England, have invented certain new and useful Improvements in Trellises, of which the following is a specification.

This invention has for its object certain improvements in devices for supporting and training sweet peas, runner beans, edible peas, clematis and other climbing plants.

The invention will be understood from the following description, reference being had to the accompanying drawings, in which—

Figure 1 is a front view of the device for supporting and training a row of sweet peas or other climbing plants, Fig. 2, a view of the coupling device, Fig. 3, a front view of the device in cylindrical form, Fig. 4, a plan view of Fig. 3 on a larger scale.

According to my improvements, I provide a reticulated fabric or netting manufactured from strong cotton, hemp or other fibrous cord, the threads of the cord being tied into strong knots at their intersections A, so as to form rectangular meshes B and C. The longitudinal threads of this netting are placed nearer together at the edge of the fabric that is nearest the ground, so that the meshes C are somewhat smaller than the meshes B, the object being to provide a closer mesh for very young climbing plants to cling to, while above (where so close a mesh is unnecessary) the mesh is wider. The netting when manufactured, is tanned and rot proofed to add to its durability. Plants are found to cling to this material far better than to metal wire.

When a line of netting (Fig. 1) is required for sweet peas or other climbing plants, I take a length of netting, and insert strong posts D in the ground about eight feet apart. These I join together with strain wire E (or wooden strips) from post to post, attaching each end of the wire to a stake driven firmly into the ground a few feet away from the post at each end of the row. The lower wire E is about six inches above the ground level. The netting is affixed to the top wire by strong cord F (Fig. 1) or by means of the coupling device G (Fig. 2) and afterward affixed to the bottom wire, the two ends of the netting being finally fastened to the posts D and made firm, so as to be quite taut.

The coupling device for coupling the top and bottom threads J of the network to the top and bottom strain wires E which lie in substantially the same plane, consists of a piece of wire (Fig. 2) whose ends G are bent up so as to lie approximately parallel, while the part g intermediate between the two ends is bent upward obliquely to a bend at mid-length. The bend at mid-length engages the wire E, while the bends between g and G engage the thread J of the netting on both sides of the perpendicular cord, and these bends are wider than the diameter of the respective threads or wires, so as to permit the coupling device when hooked thereonto, to lie in substantially the same plane, and with the respective lines E and J interlaced with the respective bends. The two ends extend above wire E.

I am aware that a spring clip made in the form of a double hook has been proposed for attaching to the wires that run from end to end of a hop yard, and from which string or the like is suspended, but in that case the device in the central part was formed with an eye which was made to fit the gage of the wire to which it was to be applied, the wire being passed axially through it (not interlaced), and the eye was closed on to the wire by a presser tool, so as to produce a permanent fastening and prevent it falling off, while the two hooked ends were only for hitching on a training cord and did not extend above the bend at mid-length. In my device no such closing by a presser tool is required, the lines being interlaced with the device, and the two ends extend above the bend at mid-length so as to bear against the line E, as shown in the drawing. In use my coupling device may be used, if desired, in an inverted position to that shown in Fig. 2.

When a cylindrical net-work support is required (Figs. 3 and 4), I provide a pair of circular members H removably hung horizontally on a vertical stick or standard I driven into the ground, and the rings H spaced apart a suitable distance. The netting is the same as that already described, except that instead of being made in a long length, it is made of a circular piece the same diameter as the members H, so that the top and bottom threads J, bind around the top and bottom circular members respectively. The two circular members H are preferably of creosoted wood, each bent into the form of a ring or band, with the two ends fastened together by staples K or otherwise. For the purpose of providing means for securing the rings adjustably on the vertical stick I, each ring is provided with a pair of radial members L, each made of a piece of wire bent to a right angle, with the ends having a hook formation to clip on to the wood ring, while the bent wire at the apex is kinked (or bent abruptly outward) and the adjacent corners of the wires fastened together by binding wire M, so that a loop N is formed at the center of the ring H, which grips the stick I, and thus holds the ring in place horizontally on the stick. Or if desired, the wire members L need not be bent at the apex with a sharp outward bend, but the apex at the bend of one wire L is made to overlap the apex of the other wire L, and the two wires where they cross one another, fastened together by a wire binding M. The stick is passed endwise through the loops N of a pair of rings H, the resiliency of the wire causing the loop to press against the stick, and thus hold the rings in place, one say about six inches above the ground, and the other near the top of the stick. The netting is affixed to the top and bottom rings by its threads J.

I declare that what I claim is:—

1. A trellis for supporting and training climbing plants, comprising a network of cord, the longitudinal and cross threads of which are knotted together at the intersections to form rectangular meshes in such manner that the mesh is closer at the edge of the network nearest to the ground.

2. A trellis for supporting and training climbing plants, comprising a network of cord, the longitudinal and cross threads of which are knotted together at the intersections to form rectangular meshes, in combination with means to support said network, and coupling means to connect said network and said supporting means comprising pieces of wire bent into the shape of a letter W with rounded angles and with the ends of the outer limbs extending beyond the center bend.

3. A trellis for supporting and training climbing plants, comprising a cylindrical piece of network of cord, the longitudinal and cross threads of which are knotted together at the intersections to form rectangular meshes in combination with means for supporting said network, said means comprising top and bottom rings adapted to grip a supporting stick.

4. A trellis for supporting and training climbing plants, comprising a cylindrical piece of network of cord, the longitudinal and cross threads of which are knotted together at the intersections to form rectangular meshes in combination with top and bottom rings adapted to grip on to a supporting stick by means of radial members whose adjacent ends form a loop adapted to grip said supporting stick.

5. A trellis for supporting and training climbing plants, comprising a cylindrical piece of network of cord, the longitudinal and cross threads of which are knotted together at the intersections to form rectangular meshes in combination with top and bottom rings adapted to grip on to a supporting stick by means of radial members whose adjacent ends form a loop adapted to grip said supporting stick, and a coupling device to connect said network to said top and bottom rings, comprising pieces of wire bent into the shape of a letter W with rounded angles, the outer limbs of which extend beyond the center bend.

6. A trellis for supporting and training climbing plants, comprising a cylindrical piece of network of cord whose longitudinal and cross threads are knotted together at their intersections to form rectangular meshes, the mesh being closer at the edge nearest the ground, in combination with top and bottom rings adapted to grip on to a supporting stick.

In witness whereof, I have hereunto signed my name this 26th day of June 1912, in the presence of two subscribing witnesses.

JOSEPH LYTLE, Jr.

Witnesses:
 G. C. DYMOND,
 C. McCALLUN.

Copies of this patent may be obtained for five cents each, by addressing the "Commissioner of Patents, Washington, D. C."